United States Patent
Cagenius

(10) Patent No.: US 7,047,028 B2
(45) Date of Patent: May 16, 2006

(54) OPTICAL FIBER COUPLING CONFIGURATIONS FOR A MAIN-REMOTE RADIO BASE STATION AND A HYBRID RADIO BASE STATION

(75) Inventor: Torbjörn Cagenius, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 214 days.

(21) Appl. No.: 10/295,024

(22) Filed: Nov. 15, 2002

(65) Prior Publication Data
US 2004/0096222 A1 May 20, 2004

(51) Int. Cl.
*H04B 15/00* (2006.01)
(52) U.S. Cl. .................. 455/502; 455/561; 398/115
(58) Field of Classification Search ............ 455/500, 455/502, 503, 504, 67.16, 13.2, 561, 560, 455/524, 525; 398/70, 71, 72, 69, 161, 115; 725/129; 370/517, 503, 508, 350
See application file for complete search history.

(56) References Cited

U.S. PATENT DOCUMENTS

| | | | |
|---|---|---|---|
| 5,067,173 A | | 11/1991 | Gordon et al. |
| 5,377,035 A | | 12/1994 | Wang et al. |
| 5,542,119 A | | 7/1996 | Grube et al. |
| 5,627,879 A | | 5/1997 | Russell et al. |
| 5,646,946 A | * | 7/1997 | VanderMeer et al. ....... 370/442 |
| 5,761,619 A | | 6/1998 | Danne et al. |
| 5,771,462 A | * | 6/1998 | Olsen .................... 455/524 |
| 5,805,976 A | * | 9/1998 | Frichtel et al. ............. 455/8 |
| 5,805,983 A | * | 9/1998 | Naidu et al. ............ 455/67.16 |
| 6,091,705 A | * | 7/2000 | Regula .................... 370/223 |
| 6,239,720 B1 | * | 5/2001 | Kim et al. .................. 340/5.1 |
| 6,336,042 B1 | | 1/2002 | Dawson et al. |
| 6,366,571 B1 | | 4/2002 | Fiut et al. |
| 6,553,224 B1 | * | 4/2003 | Kim .......................... 455/3.05 |
| 6,711,140 B1 | * | 3/2004 | Agarwal et al. ............ 370/324 |
| 6,721,571 B1 | * | 4/2004 | Tran et al. ................. 455/453 |

FOREIGN PATENT DOCUMENTS

EP 0497035 8/1992

(Continued)

OTHER PUBLICATIONS

International Preliminary Report on Patentability completed on Mar. 15, 2005.

*Primary Examiner*—Eliseo Ramos-Feliciano
(74) *Attorney, Agent, or Firm*—Nixon & Vanderhye P.C.

(57) ABSTRACT

A main-remote radio base station system includes plural remote radio units. Fiber costs are significantly reduced using a single optical fiber that communicates information between the main unit and the remote units connected in a series configuration. Information from the main unit is sent over a first fiber path to the remote units so that the same information is transmitted over the radio interface by the remote units at substantially the same time. The main unit receives the same information from each of the remote units over a second fiber path at substantially the same time. Delay associated with each remote unit is compensated for by advancing a time when information is sent to each remote unit. A data distribution approach over a single fiber avoids the expense of separate fiber couplings between the main unit and each RRU. That approach also avoids the expense of WDM technology including lasers, filters, and OADMs as well as the logistical overhead needed to keep track of different wavelength dependent devices.

41 Claims, 12 Drawing Sheets

FOREIGN PATENT DOCUMENTS

| | | |
|---|---|---|
| EP | 0635988 | 1/1995 |
| EP | 1047276 | 10/2000 |
| JP | 64-32799 | 2/1989 |
| JP | 6-188791 | 7/1994 |
| JP | 8-167876 | 6/1996 |
| WO | WO 98/04052 | 1/1998 |
| WO | WO 98/36601 | 8/1998 |

* cited by examiner

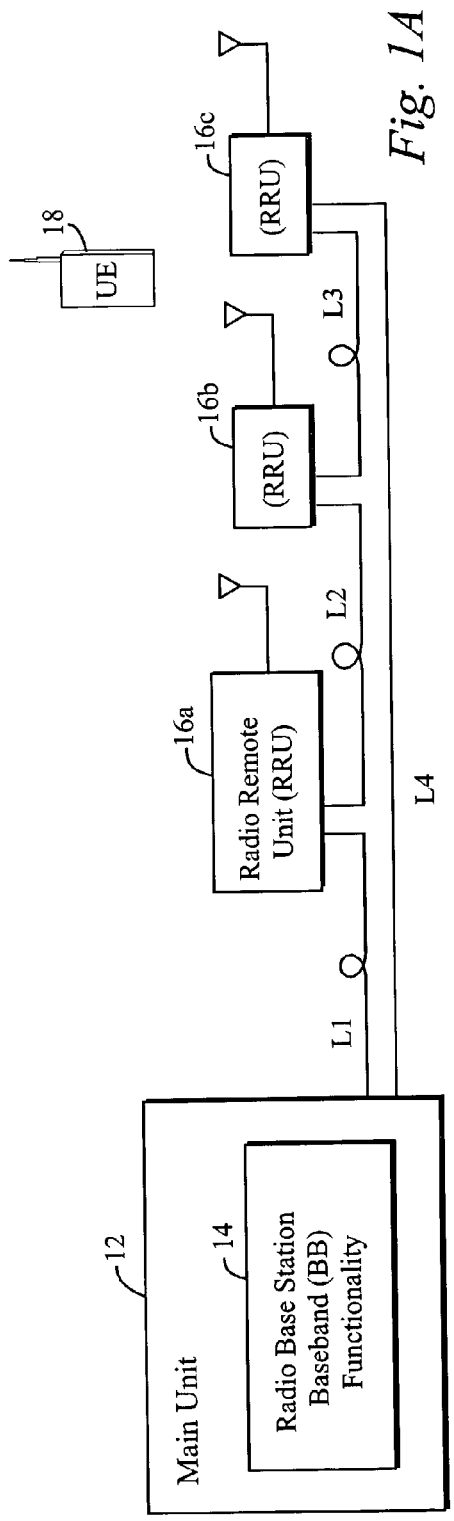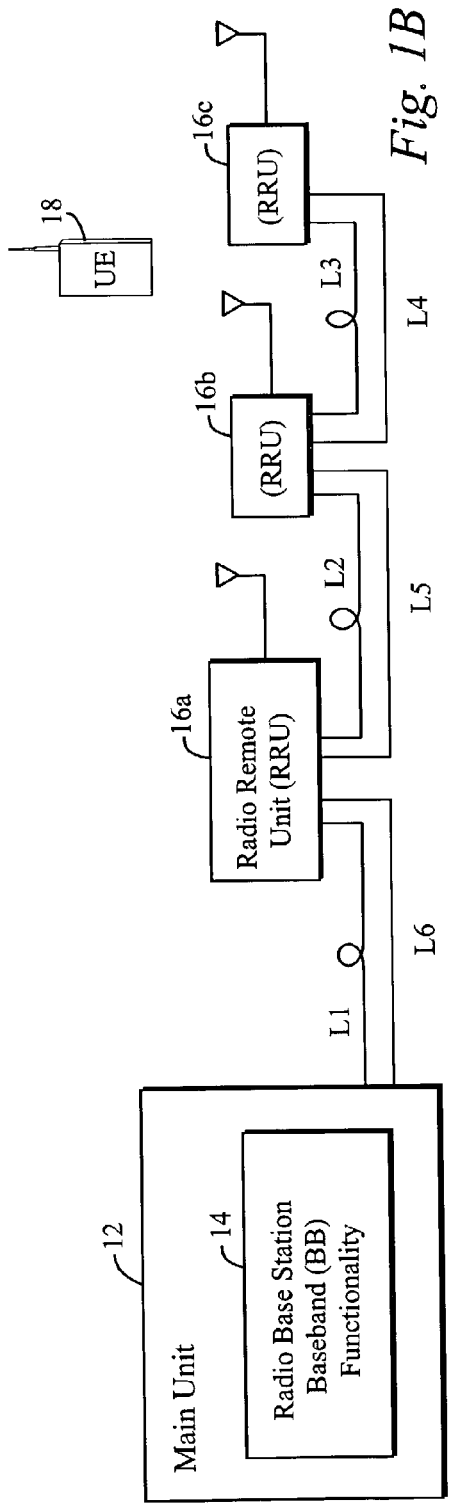

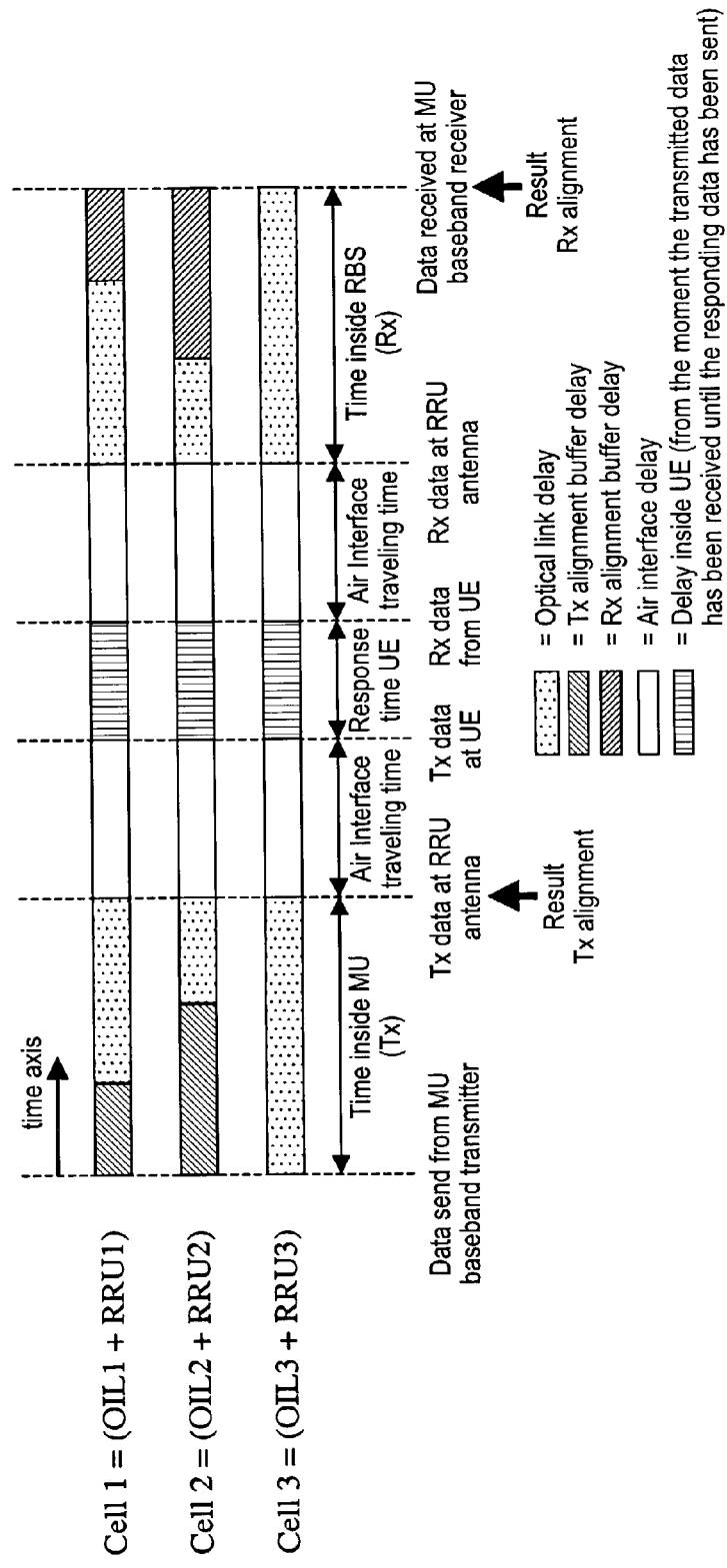

OPTICAL FIBER COUPLING CONFIGURATIONS FOR A MAIN-REMOTE RADIO BASE STATION AND A HYBRID RADIO BASE STATION

FIELD OF THE INVENTION

The present invention is directed to radio communications where a base station includes a main baseband processing unit and plural radio remote units where RF processing occurs.

BACKGROUND AND SUMMARY OF THE INVENTION

A conventional radio base station in a cellular communications system is generally located in a single location, and the distance between the baseband circuitry and the radio circuitry is relatively short, e.g., on the order of one meter. A distributed base station design, referred to as a main-remote design, splits the baseband part and the radio part of the base station. The main unit (MU) performs base band signal processing, and one or more radio remote units (RRUs) converts between baseband and radio frequencies and transmits and receives signals over one or more antennas. Each RRU serves a certain geographic area or cell. Separate, dedicated optical links connect the main unit to each of the plural radio remote units. Each optical link includes one optical fiber for carrying digital information downlink from the main unit to the RRU and another optical fiber for carrying digital information uplink from the RRU to the main unit.

Some mobile communication standards, e.g., the code division multiple access (CDMA) cellular system, permit a UE to communicate with two or more RRUs of the same base station using "softer handover." In softer handover, two or more RRUs simultaneously transmit the same information to the UE and receive the same information from the UE. The simultaneously transmitted signals must be processed to generate a single signal. Some radio standards require that in the downlink direction, the signals simultaneously transmitted to the UE from different antennas be aligned with a timing reference at the antennas. That alignment makes combining those different signals easier on the receiver. In the uplink direction, the main unit base band functionality includes a rake receiver which combines the "same" signals received from the UE via the RRUs and generates a single signal. Because of differing path lengths to each RRU, these signal components received at the main unit base band functionality from different radio remote units are not time and phase aligned to each other. Although a rake receiver can combine out-of-phase signals from different signal paths, a less complicated and less expensive rake receiver may be used if the phase/delay differences between different signal paths are kept small.

In a main-remote radio base station, a significant phase or timing difference may be attributed to the different lengths of the optical fibers coupling different RRUs to the main unit as compared to a conventional base station. Different optical link delays are more problematic as the distance between the remote unit 16 and the main unit increases, e.g., 10 kilometers. In addition, such delays are not constant and may vary depending on temperature and other factors. Without compensation, the different optical fiber lengths to the remote units result in a time/phase shift of the signals sent out from the antennas connected to the radio remote units. They also lead to larger time/phase shifts between the UE signal components received via different radio remote units. These time/phase shifts may be difficult for conventional receivers in the UE and in the base station to handle. A similar problem exists in a hybrid base station that incorporates both conventional near radio units and remote radio units. The near radio units, which do not have any optical link delays, are not synchronized with the remote radio units that do have link delays. One optical link delay/synchronization solution is presented in commonly-assigned, U.S. patent application Ser. No. 10/252,827, filed on Sep. 23, 2002, entitled "Synchronizing Radio Units In A Main-Remote Radio Base Station And In A Hybrid Radio Base Station," the disclosure of which is incorporated herein by reference.

Another challenge in main-remote configurations is how best to connect the main and remote units. Separate optical fibers with associated separate lasers and light detectors may be used to link the main unit with each remote unit. Each RRU communicates with the main unit using its own dedicated optical fiber loop. But the amount of fiber required is significant—as is the cost for separate main unit—RRU fiber loops. The cost of the laser and detector equipment associated with each fiber pair in the main unit is also significant. And in some deployment scenarios may require cascading several remote units, e.g., along a highway, in a tunnel, or along an existing fiber infrastructure, e.g., a metro ring. So it would be desirable to connect the main unit with each remote unit using a single fiber.

FIG. 1A shows an example of a main-remote base station system at reference numeral 10 where the main unit and RRU are connected in cascade using a single fiber. The main unit 12 includes radio base station baseband (BB) functionality 14. An optical fiber divided into four links L1–L4 connects the main and remote units in a loop. A first optical link L1 couples the main unit 12 to a first radio remote unit 16a. A second optical link L2 couples the main unit 12 to a second radio remote unit 16b. A third optical link L3 couples the main unit 12 to a third radio remote unit 16c. A fourth optical link L4 couples the third radio remote unit 16c to the main unit 12. Of course, additional radio remote units could be coupled to the main unit 12. A mobile radio user equipment (UE) 18 and one or more of the radio remote units 16a–16c communicate over a radio interface.

In cascade and ring topologies, where the units are connected in series, wavelength division multiplexing (WDM) may be used to reduce the amount of fiber used and the laser/detector equipment. Each remote unit is assigned its own, corresponding laser wavelength. The different wavelength communications for all of the remote units are multiplexed onto a single fiber. One downlink fiber is used for traffic from the main unit to all the remote units, and one uplink fiber is used for traffic from the remote units to the main unit making up a single fiber loop. An optical add/drop multiplexer (OADM) is located inside or near each remote unit. The OADM adds or drops only the unique wavelength related to that particular remote unit to the fiber. A drawback with this approach is the expense of WDM technology including lasers, filters, and OADMs. Another is logistical overhead to keep track of different wavelength dependent devices.

It is an object of the present invention to provide a cost effective optical fiber configuration to couple a base station main unit and plural base station remote units.

It is an object of the invention to provide such a cost effective optical fiber configuration that requires a single optical downlink fiber path and a single optical uplink fiber path, (together forming a single optical fiber path), to carry information between the main unit and the remote units.

It is an object of the invention to provide one or more single optical fiber pair configurations that avoid some or all of the expense of WDM technology.

It is an object of the invention to provide such a cost effective fiber configuration that avoids some or all of the logistical WDM overhead to keep track of different wavelength dependent devices.

It is a further object to compensate for time delay differences associated with different remote units coupled in a cascade, loop, or ring optical fiber configuration where the units are connected in series.

The present invention solves the problems identified above and satisfies the stated and other objects. A main-remote radio base station system includes plural remote radio units. Optical fiber costs are significantly reduced using a single optical fiber loop (one downlink fiber path and one uplink fiber path) to communicate information between the main unit and the remote units in a cascade, loop, or ring configuration. Example configurations are described below.

Information from the main unit is sent over a first fiber in the pair to the remote units so that the same information is transmitted by the remote units at substantially the same time. Assuming there are N remote units, N being a positive non-zero integer), the main unit sends out the information over the first fiber at N times the rate at which data is to be received at each remote unit. The main unit receives the same information from each of the remote units over the second fiber at substantially the same time. A data distribution approach over a single fiber loop avoids the expense of WDM technology including lasers, filters, and OADMs as well as the logistical overhead needed to keep track of different wavelength dependent devices.

The main unit combines N words of data, one word corresponding to each of the N remote units, into a frame and transmits the frame on the fiber. From the received frame, each remote unit removes its corresponding data word, includes an uplink word in the removed word's place, and passes the frame to the next remote unit. Because one fiber loop carries all of the information for each of the N remote units, the data rate is N times the data rate that would be used if each remote unit was coupled to the main unit with its own fiber loop.

Delay associated with each remote unit is compensated for by advancing a time when information is sent to each remote unit. A timing compensator for each remote unit compensates for any associated delay. Information is sent in advance of the time when it would otherwise be sent without that delay, i.e., in a conventional base station. As a result, the information is received at each of the remote radio units at substantially the same time as in conventional radio base stations with only near radio units, despite the different delays associated with each remote radio unit. The advanced-in-time transmission together with equalization for the uplink direction also ensures that a response sent by each of the remote radio units is received in the main unit at substantially the same time, despite the different delays associated with each remote radio unit.

Based on the delays received for each remote unit, the timing compensation controller selects a maximum delay. In an example embodiment, that delay corresponds to the delay associated with the remote radio unit farthest from the main unit. An advanced transmit time is determined for each remote radio unit based on the maximum link delay. In a specific example embodiment, the transmission time for digital timing and data signals is advanced by twice the maximum link delay.

The main digital interface unit includes for each remote radio unit a transmit buffer and a receive buffer. The timing compensation controller sets the transmit buffering time that the data signal is stored in the transmit buffer before the data signal is sent on the one or more digital data channels. A responsive data signal from the remote digital interface unit is stored in the receive buffer for a receive buffering time. The sum of the transmit buffering time or receive buffering time and the delay for the remote unit equals the maximum delay. Delay differences associated with distance differences on the order of meters up to 100 kilometers or more can be compensated.

The invention may also be employed in a hybrid radio base station that includes both near/conventional and remote radio units.

The present invention provides a cost effective optical fiber configuration to couple a base station main unit and plural base station remote units. Only a single optical fiber loop is needed to carry information between the main unit and the remote units. The configuration avoids the expense and drawbacks if WDM technology were used in a single fiber loop configuration. Lasers, filters, and optical add/drop multiplexers (OADMs) for each RRU are not needed thereby eliminating costs necessary for a WDM fiber loop configuration. The logistical WDM overhead required to keep track of different wavelength dependent devices is also avoided. In addition to cost savings, the invention compensates for time delay differences associated with different remote units coupled in series by a single fiber to ensure synchronization.

BRIEF DESCRIPTION OF THE DRAWINGS

The foregoing and other objects, features, and advantages of the present invention may be more readily understood with reference to the following description taken in conjunction with the accompanying drawings.

FIGS. 1A–1D illustrate different example configurations of a main-remote radio base station system;

FIG. 7 shows a timing diagram illustrating an example of delay equalization for a main unit-three remote unit configuration;

DETAILED DESCRIPTION

Figure 1C:
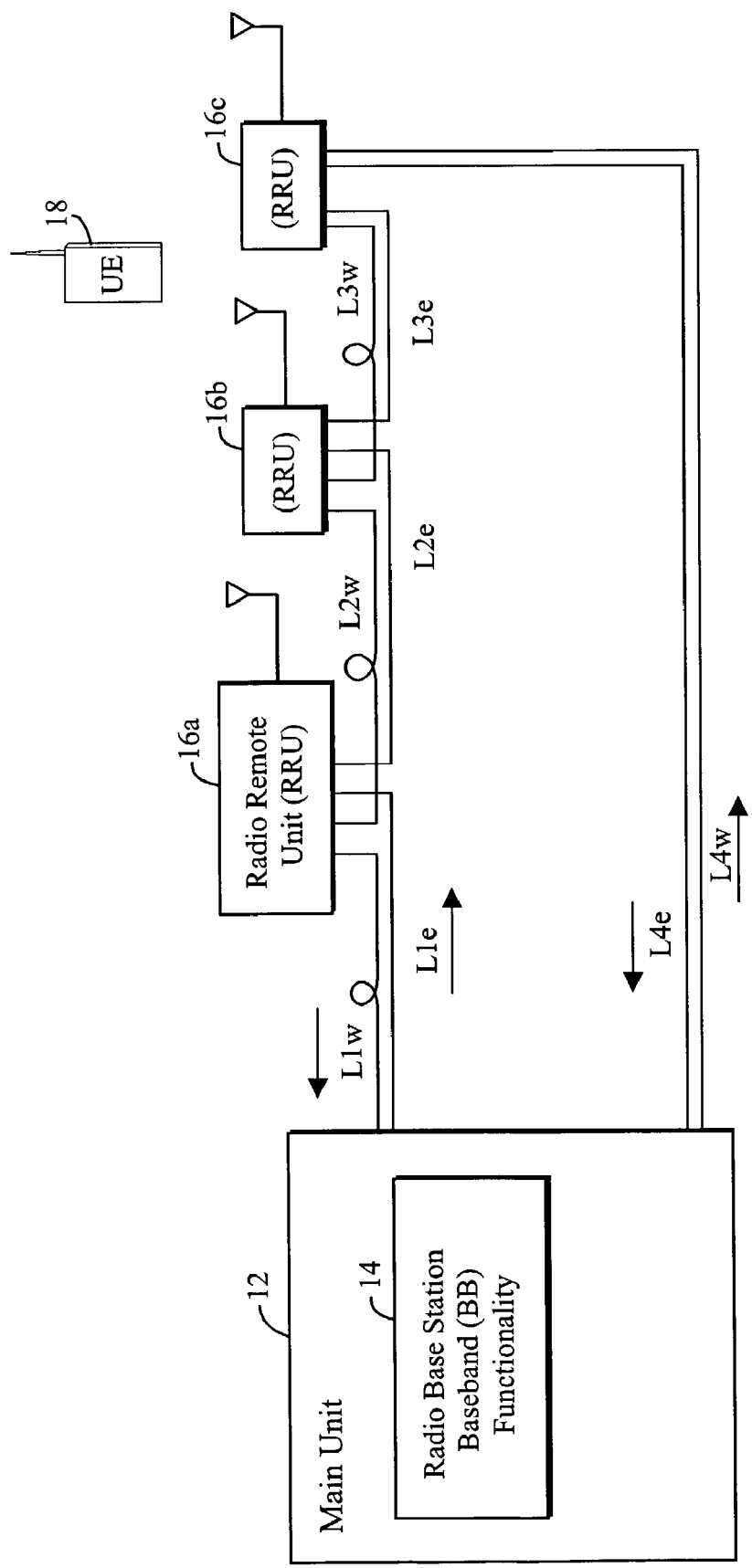

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. For example, while the present invention is described in an example application to a CDMA-based cellular system, the present invention may be used in any cellular system employing a main-remote radio base station architecture having any number of remote units configured in any network topology where plural RRUs can be coupled in an optical fiber loop. It may also be used in any cellular system employing a hybrid base station. Although some of the following examples employ a single fiber loop, the invention may also be used in coupling configurations that use plural fibers.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

The present invention finds advantageous, but still example, application to a CDMA mobile communications network that supports softer handover. In this example application, one or more external networks is coupled to a CDMA-based radio access network which, for example, may be a UMTS Terrestrial Radio Access Network (UTRAN). The UTRAN includes one or more radio network controllers (RNC) which communicate over a suitable interface, and each RNC is coupled to plural radio base stations. One or more the radio base stations may be configured as a main-remote base station system such as is shown in FIG. 1A where different remote radio units (RRUs) 16 are coupled to a main unit 12 via a single optical fiber. A series configuration communicates information from the main unit to all of the RRUs over one optical fiber and any intervening RRUs, although additional or redundant fibers may be used. Preferably, a synchronous connection is employed between the main unit and the remote units to minimize the need for "intelligence" in the remote units such as buffering, resynchronization, etc., and thereby cost. A synchronous connection seeks to keep the RF signal at each remote unit's antenna within specified limits relative to a reference signal in the main unit.

The optical fiber includes a series of links that couple adjacent units together in series. In the fiber coupling configuration of FIG. 1A, four optical links L1–L4 couple the main and remote units together in series and form a loop or ring. The main unit 12 is connected to the RRU 16a by link L1 of the fiber. The RRU 16a is connected to the RRU 16b by link L2 of the fiber. The RRU 16b is connected to the RRU 16c by link L3 of the fiber. The RRU 16c is connected to the main unit by link L4 of the fiber. In combination, the links L1–L4 form a first downlink fiber path and a second uplink fiber path in a single fiber loop. The downlink path and uplink path includes different links for each RRU. For example, the downlink path for RRU 16a includes link L1, and the uplink path includes links L2, L3, and L4. The downlink path for RRU 16b includes links L1 and L2, and the uplink path includes links L3 and L4. The downlink path for RRU 16c includes links L1, L2, and L3, and the uplink path includes link L4. These two optical fiber paths can be in the same physical cable between the main and the remote units, corresponding to a "cascade" configuration, or in separate physical routes/cables, corresponding to a "ring" configuration.

Figure 1D:
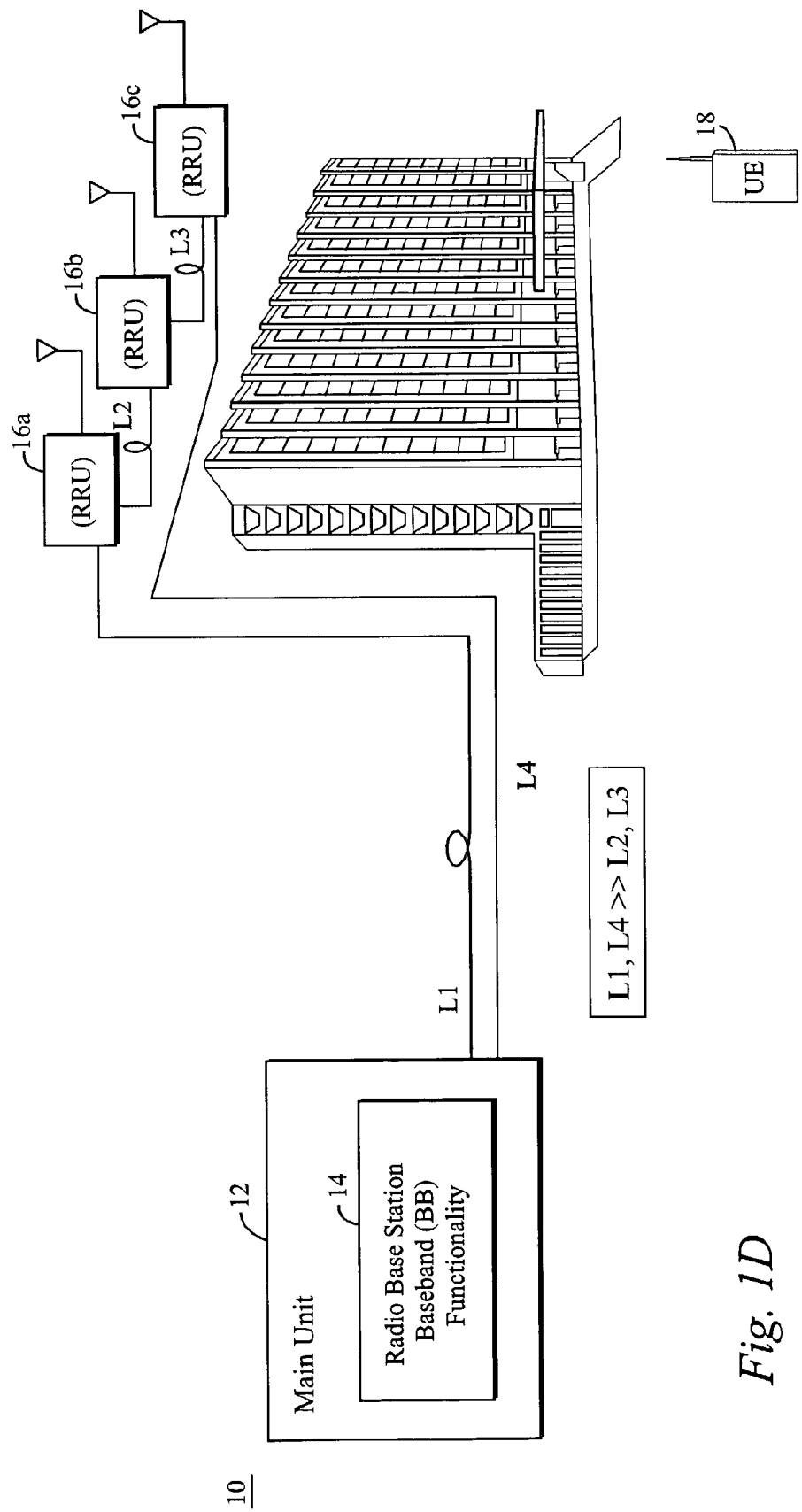

FIG. 1D shows an example of the fiber coupling configuration in FIG. 1A applied to a "sectored" base station. Each sector of the base station is served by a corresponding RRU. Because the links L1 and L4 are much longer than links L2 and L3, link delays associated with L2 and L3 may be ignored if desired, with delay compensation (described in detail below) provided for to the link delays associated with longer links L1 and L4.

FIG. 1B shows a second example, fiber coupling configuration. Like FIG. 1A, the main unit and RRU 16a are connected by link L1, RRU 16a and RRU 16b by link L2, and RRU 16b RRU16c by link L3. However, RRU 16c has a return link L4 to RRU 16b. RRU 16b has a return link L5 to RRU 16a. RRU 16a has a return link L6 to main unit 12. In effect, each RRU has an optical loop with intervening RRUs that pass on that RRU's information. For RRU 16a, the first, downlink fiber path includes links L1–L3, and the second, uplink fiber path includes links L4–L6. If the L1/L6, L2/5 and L3/L4 fiber links share the same physical cable and route, an automatic delay measurement can be used because the one-way delay is half of the round-trip delay. However, this configuration requires dual optical-to-electrical converters in each RRU.

FIG. 1C shows another example cascade configuration similar to that of FIG. 1A with an optional redundant optical fiber for communicating information between the main unit and the remote units but in the direction opposite. The first loop is the "east" loop represented by the letter "e", and the opposite loop is the "west" loop represented by the letter "e". This dual fiber loop with an east-west configuration adds redundancy as well as additional protection. Consider a situation where two fibers are cut at one location, e.g., at the L2 link between RRU 16a and 16b. The RRU16a can be re-configured automatically to use link L1w to transmit to the Main Unit 12 and to use the link L1e to receive from the Main Unit. The other RRU's can be configured correspondingly to use links L3 and L4 for communication with the Main Unit 12.

Figure 2:
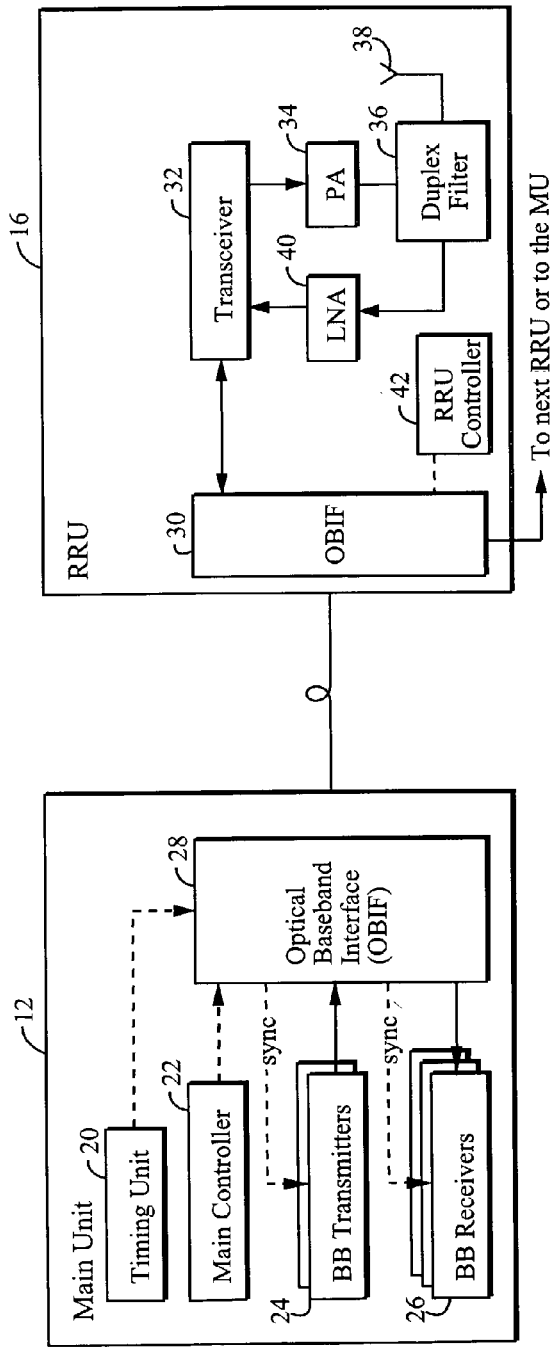
FIG. 2 illustrates in function block form a main unit and a radio remote unit from the main-remote radio base station system.

FIG. 2 illustrates in function block form the main unit 12 coupled to one RRU 16. A digital optical interface, sometimes referred to below as an Optical Interface Link (OIL) interface, is used in digital communications between the main unit 12 and the RRU 16. The main unit includes an optical baseband interface (OBIF) unit 28, and the RRU 16 includes an optical baseband interface (OBIF) unit 30. The OBIF 28 and 30 support the digital optical interface. The electrical side of the digital optical interface includes parallel, digital channels for data signals, timing signals, and control signals. The optical side outputs that digital information as a serial stream of optical signals. For a single RRU example, a 16-bit wide digital optical interface includes 16 parallel digital channels.

The main unit 12 includes a timing unit 20 that generates one or more timing signals such as a frame synchronization (FS) signal which is provided to the OBIF 28 as a digital timing channel corresponding to one or more bits in the OIL interface. A main unit controller 22 generates control signals provided to the OBIF 28 over a digital control channel corresponding to one or more bits in the OIL interface. One or more baseband transmitters 24 provide digital data to the OBIF 28 over one or more digital channels corresponding to one or more bits in the OIL interface. One or more baseband receivers 26 receive digital data sent by the RRU 16. The timing reference for the baseband transceiving circuitry may be generated in any appropriate manner. In one example, a timing signal, e.g., a frame synchronization signal provided from the OBIF 28, may be used for the baseband transmitters 24 and for the baseband receivers 26. However, the timing signals for the transmitters and receivers need not be identical, e.g., they could be altogether different or they may be shifted relative to each other.

The RRU 16 has a similar (though not identical) OBIF 30 coupled to a transceiver 32 and to an RRU controller 42. The RRU controller 42 receives and sends control signals over the digital control channel. The transceiver 32 receives and sends digital data from/to the OBIF 30. The received data is processed, modulated, filtered, frequency up-converted, and amplified in a power amplifier 34 before being transmitted over an antenna to a mobile radio UE 18 byway of a duplex filter 36. UE radio signals received from the antenna 38 and duplex-filtered at 36 are amplified in a low noise amplifier 40 and similarly handled in transceiver 32 but in complementary fashion. The OBIF 30 forwards signals received from the adjacent unit (here the main unit) to the next RRU in the series and includes any responsive UE signal as well. In the configuration in FIG. 1C, there would be another fiber input to the OBIF 30 from the adjacent, downstream RRU with signals to be sent on to the main unit 12.

Figure 3A:
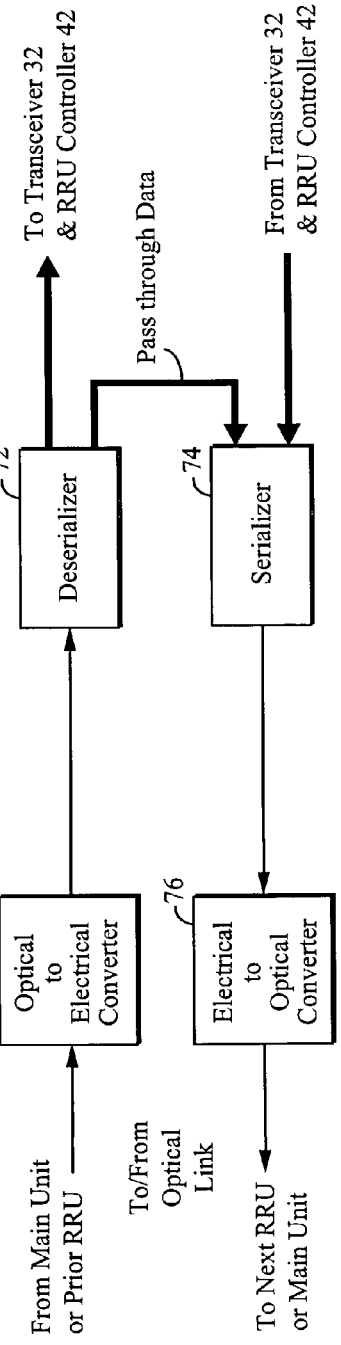
FIG. 3A illustrates in function block form one example embodiment of an optical baseband interface of the radio remote unit in the main-remote radio base station system for a configuration like that in FIG. 1A.

FIG. 3A illustrates further details of the OBIF 30 in each RRU 16 for the example coupling configuration in FIG. 1A. An optical signal transmitted over the optical link from the main unit 12 includes a frame of multiple digital "words" of information. Each word is intended for one of the RRUs and is converted into a serial digital electrical signal in an optical-to-electrical converter 70, such as a PIN diode. In the non-limiting example above, each word may include 16 bits of control, data, and sync information. If there are three RRUs connected in cascade, then the frame includes three 16-bit words. The first RRU's word is in the first position in the frame; the second RRU's word is in the second position in the frame; and the third RRU's word is in the third position in the frame. The de-serialize 72/serializer 74 can be implemented for example as a demultiplexer/multiplexer pair that may also perform link handling like setting up link synchronization, link fault handling, etc. Such a demultiplexer/multiplexer pair is available as a standard chip set, e.g., the Agilent HDMP 1032/1034 or the TI TLK 2501.

In FIG. 3A, the RRU de-serializer 72 converts the data word (16-bits of data in this example) for this RRU 16 from a serial digital signal into a parallel digital signal and routes the parallel signal to the transceiver 32 and RRU controller 42. The parallel signal sent to the transceiver 32 and the RRU controller 42 includes the digital data, timing, and control channel signals. The remaining data bits destined for the other RRUs are passed through to the serializer 74. The serializer 74 also receives parallel uplink data from this RRU to be sent to the main unit from the transceiver 32 and RRU controller 42. It converts the uplink data into serial format and includes that uplink serial data in the word position in the frame corresponding to this RRU. An electrical-to-optical converter 76 converts the digital frame into an optical signal for transmission over an optical fiber to the next RRU in the cascade or to the main unit 12 if it is next in the cascade. An example of an electrical-to-optical converter is a laser diode.

Figure 3B:
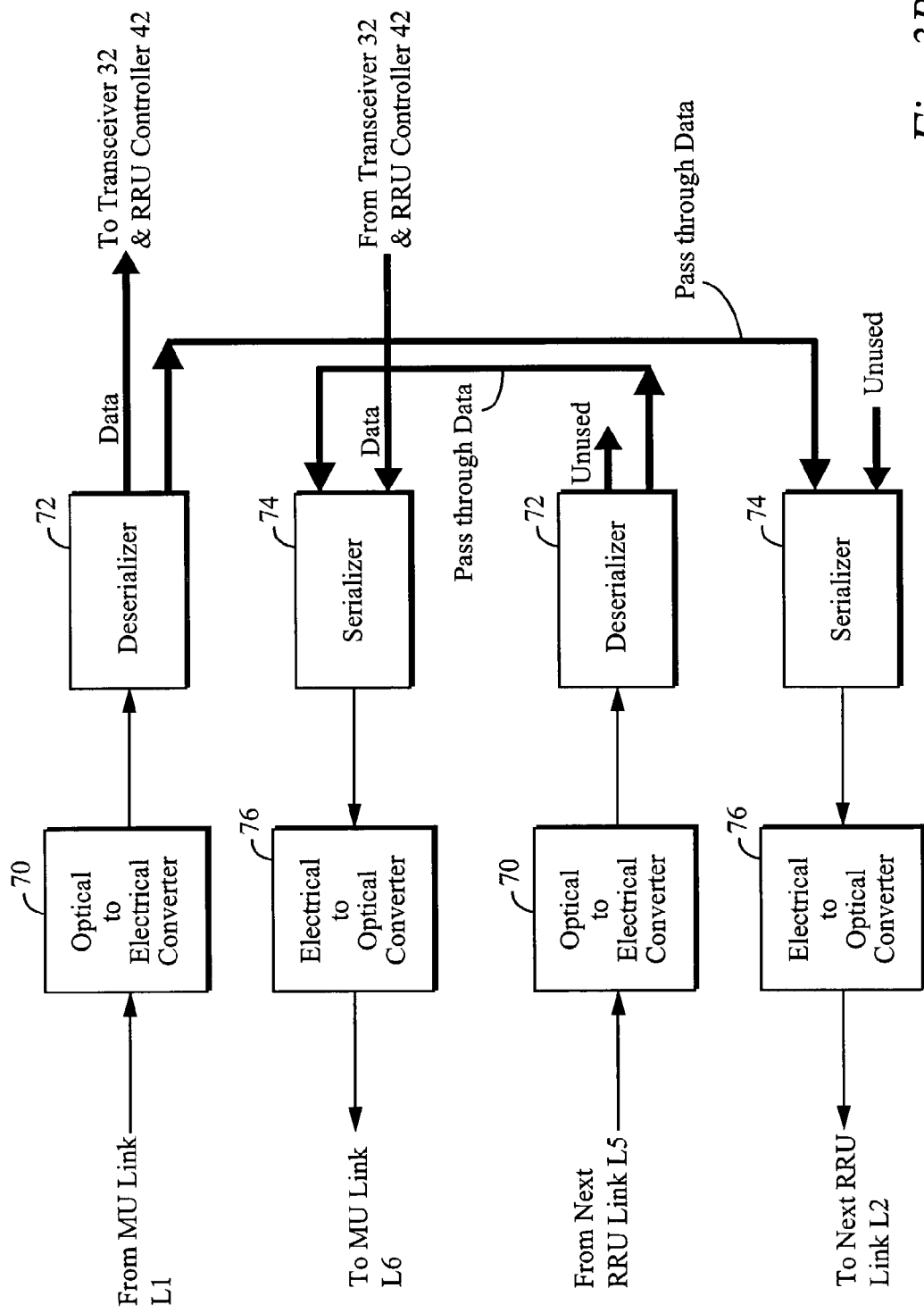
FIG. 3B illustrates in function block form another example embodiment of an optical baseband interface of the radio remote unit in the main-remote radio base station system for a configuration like that in FIG. 1B.

FIG. 3B illustrates further details of the OBIF 30 in an RRU 16 for the example coupling configuration in FIG. 1B. In this case, RRU 16a is used for purposes of illustration. The OBIF 30 is similar to that shown in FIG. 3A except that two sets of converters 70, 76 and de-serializers/serializers 72, 74 are employed. The main unit sends an optical signal over link L1 to RRU 16a. The received optical signal is converted into electrical signal by an optical to electrical converter 70, which delivers the digital electrical signal to the de-serializer 72. The RRU de-serializer 72 converts the data word for this RRU 16a from a serial digital signal into a parallel digital signal and routes that parallel signal to the transceiver 32 and RRU controller 42 in this RRU 16a. The remaining data bits destined for the other RRUs (16b and 16c) are passed through to the serializer 74 at the bottom of the figure. That serializer 74 converts that passed through data into serial format and sends the serial signal to the electrical-to-optical converter 76. The electrical-to-optical converter 76 converts the received electrical signal into an optical signal for transmission over the optical link L2 to the next RRU 16b.

In the opposite, uplink direction, the RRU 16a receives an optical signal from RRU 16b over link L5 and coverts it into electrical format in optical to electrical converter 70. The de-serializer 72 converts the serial digital signal from converter 70 into a parallel digital signal that includes data words from RRU 16b and RRU 16c. The parallel digital signal is provided to the serializer 74 as pass through data. The serializer 74 inserts uplink data words from the transceiver 32 and controller 42 in RRU 16a into each frame with words from RRU 16b and RRU 16c. The serializer 74 converts the framed data words into serial format and sends the serial signal to the electrical-to-optical converter 76. The electrical-to-optical converter 76 converts the digital signal into an optical signal for transmission over an optical link L6 to the main unit 12.

Figure 4A:
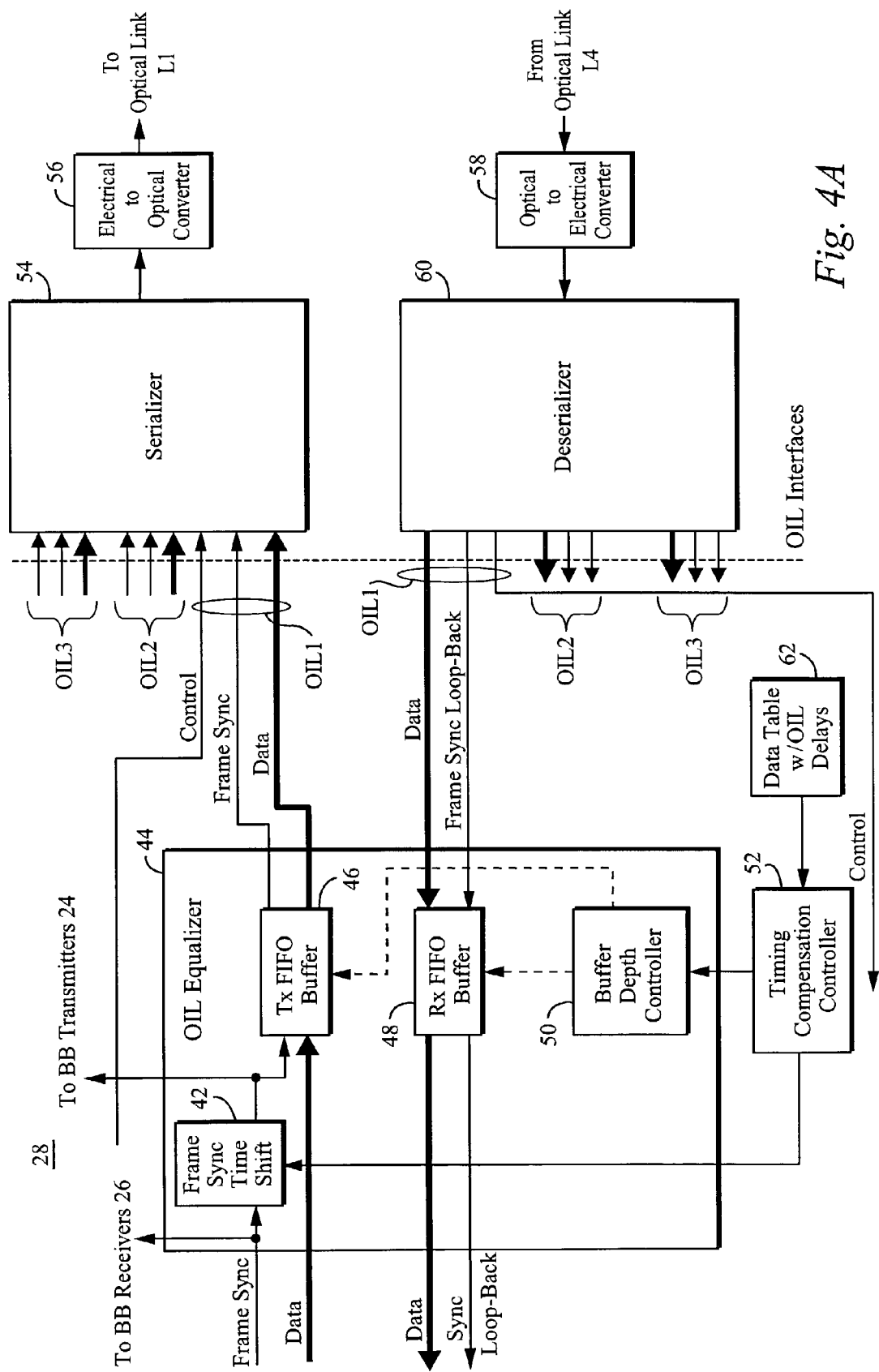
FIG. 4A illustrates in function block form one example embodiment of the optical baseband interface of the main unit in the main-remote base station system.

FIG. 4A illustrates further details of the OBIF 28 in the main unit 12 assuming a configuration like the one in FIG. 1A. Details are shown for one of the RRUs—RRU 16a—to simplify the illustration and explanation. Each RRU has an associated OIL label, e.g., RRU 16a has OIL 1, RRU 16b has OIL 2, and RRU 16c has OIL 3. Because the control signaling relates only to the RRU, it does not require any OIL equalization.

In this example, the OIL equalizer 44 includes for each RRU a time shifter 42, a transmission buffer 46, a receive buffer 48, and a buffer depth controller 50. The transmission (Tx) buffer 46 associated with each RRU is a first-in-first-out (FIFO) buffer that receives data from the baseband transmitter 24. The data is stored for a time period corresponding to the FIFO's buffer depth before being output on the data channel to the serializer 54. The main unit processor 22 provides the digital control signal for each word, and the main unit OIL equalizer 44 provides the digital data and timing signals for each word. The serializer 54 receives words from the TX buffers associated with each RRU and includes three digital words—one for RRU 16a, one for RRU 16b, and one for RRU 16c—into a frame. The words are positioned in the frame in sequential order—word 1, word 2, and word 3—for easy extraction at the appropriate RRU by its deserializer 72. The serializer 54 then converts the parallel data into serial form and sends the serial data to the electrical to optical converter 56 for conversion to optical format and transmission over the next fiber link, which in this example is link L1.

The FIFO buffer is controlled by the buffer depth controller 50. In this example implementation, the timing reference comes from a frame synchronization signal. The frame sync is sent to the base band receivers 26 (unshifted in time) and to the frame sync time shifter 42. The frame sync time shifter 42 advances the frame sync signal by a predetermined time interval, (described below), and sends the time-advanced frame sync to the transmission FIFO buffer 46. The frame sync is delayed in the FIFO buffer 46 along with the data to preserve the timing relationship between the frame sync and the data. The shifted frame sync is used by the base band transmitters 24 for early transmission of the downlink data as described further below. The unshifted frame sync is sent to the base band receivers 26 as a timing reference.

Rather than advance the downlink timing reference signal by a predetermined amount, as above, another example approach is to delay the uplink timing reference signal by the predetermined amount. This latter approach does not require shifting of the frame sync signal in the downlink path but in the uplink path. Still another example approach does not rely on or affect the transmit frame sync, but instead the transmit timing is advanced by a software setting in the transmitter.

In the uplink direction, the optical to electrical converter 58 receives an optical signal from the optical link L4 and converts it into electrical format. The de-serializer 60 converts that serial signal into parallel format. Each OIL equalizer 44 includes a receive FIFO buffer 48 that receives the parallel digital data and a "looped back" frame sync signal from the corresponding de-serializer 60. The data and frame sync are stored for a time period, corresponding to the FIFO's buffer depth and controlled by the buffer depth controller 50, before outputting the data and frame sync on the data channel and timing channels, respectively. The FIFO data and frame sync are sent to the baseband receiver 26.

A data table 62 is provided which stores, for the example configuration of FIG. 1A, delays associated with each RRU. Specifically, each RRU is a different distance from the main unit. In this example in FIG. 4A, those delays are measured manually, and the measured delays are stored in the data table 62. The timing compensation controller 52 accesses the delay for each RRU when setting the buffer depth controlled by the buffer depth controller 50.

Figure 4B:
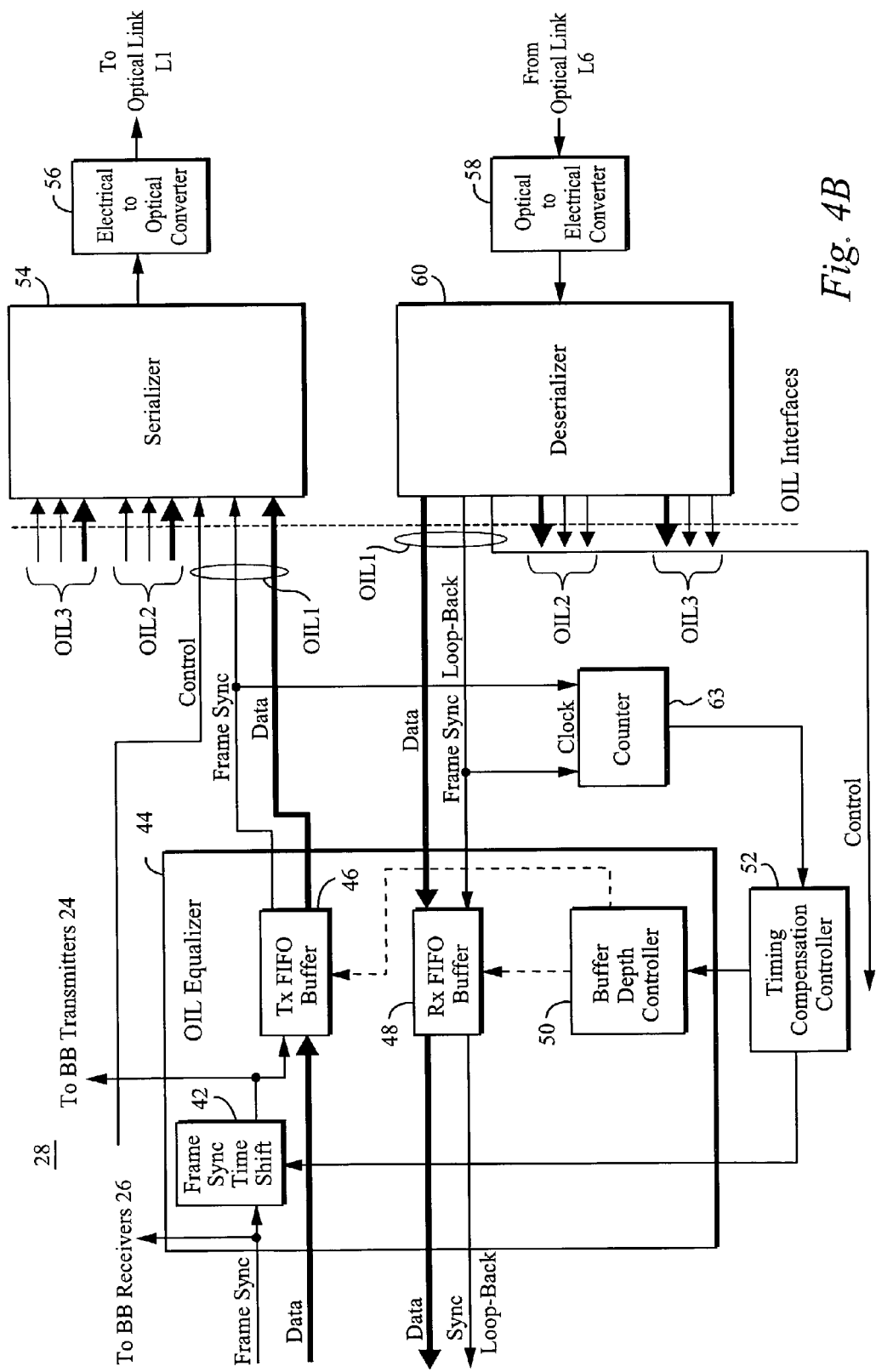
FIG. 4B illustrates in function block form another example embodiment of the optical baseband interface of the main unit in the main-remote base station system.

Assuming an alternative example fiber coupling configuration like the one shown in FIG. 1B, FIG. 4B illustrates further details of the OBIF 28 in the main unit 12 for one of the RRUs—RRU 16*a*. Assuming the L1/L6, L2/5 and L3/L4 fiber links share the same physical cable and route, an automatic delay measurement can be used because the one-way delay is half of the round-trip delay. Instead of manually measuring delays associated with each of the RRUs and storing them in a data table 62, FIG. 4B employs a counter 63 for automatically measuring those delays. More specifically, at the same time the frame sync signal is sent to the corresponding serializer 54, it is also sent to start the counter 63. The counter 63 counts, using a clock or other appropriate signal, until it is stopped by receipt of the looped back frame sync signal from the de-serializer 60. The count value, corresponding to the measured delay associated with sending data to a particular RRU is provided to the timing compensation controller 52.

The timing compensation controller 52 receives delay count values for the other RRUs and determines a maximum delay value. As one example, the timing compensation controller 52 may select the largest count value as the maximum delay value. The timing compensation controller 52 sends twice the maximum delay value to the time shifter 42 to provide the advanced time reference when the data and frame sync should be sent to the transmission buffer 46. The timing compensation controller 52 uses the difference between the maximum delay and the measured/counted delay value for each RRU to determine the FIFO buffer depth sent to the buffer depth controller 50.

Figure 5:
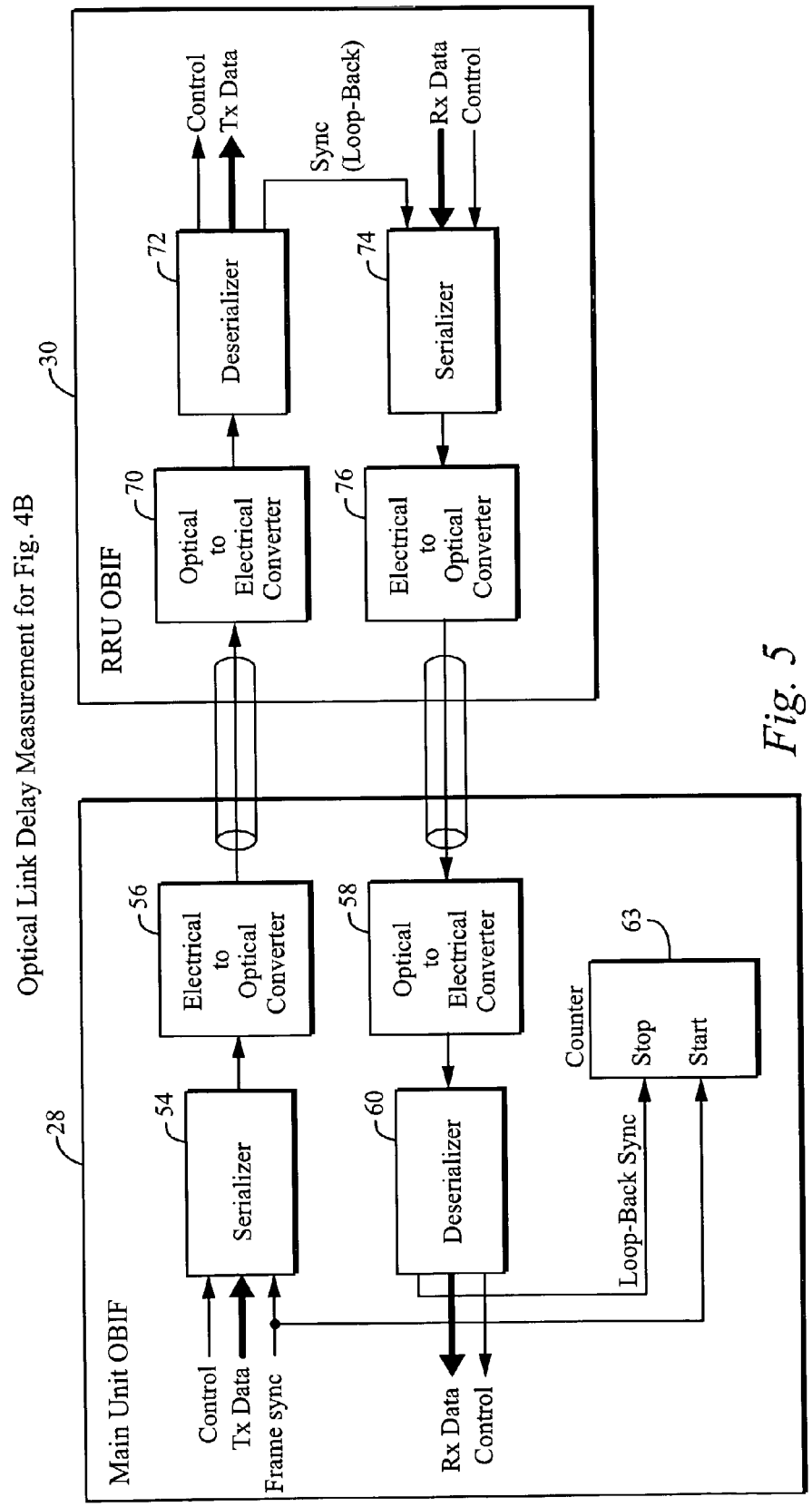
FIG. 5 illustrates digital optical interface link delay measurement in accordance with the example shown in FIG. 4B.

The automatic optical link delay measurement is illustrated conceptually in FIG. 5 for a single main unit/remote radio unit link. The same measurement process may be used for all of the remote radio units. The frame sync pulse in the main unit OBIF 28 starts the timer 63. At the same time, the frame sync pulse is transmitted over the downlink fiber path and any intervening RRUs to the RRU OBIF 30 where the de-serializer 72 "loops it back" over the return fiber path via an intervening RRUs to the main unit. Delays over the air interface and in the UE are not measured. The serializer 74 returns the looped back frame sync over the return fiber path in the optical link to the main unit OBIF 28 where it stops the counter. The delay time required to loop the sync pulse back is reflected in the count value and is forwarded to the timing compensation controller 52. Although another timing signal could be used or even generated to perform this task, using the already-available frame sync pulse generated by the main unit requires no additional overhead or expense.

By having the frame sync communicated on its own digital timing channel, the delay measurement does not interrupt the transmission of data over the digital channel. Moreover, the delay measurement may take place continuously, periodically/at regular intervals, or upon request by the timing compensation controller 52. Indeed, the delay caused by each optical link may change depending on certain factors. One factor is changing temperature. The independent (i.e., from the data channel) and ongoing delay measurement capability ensures that the timing compensation controller 52 has up-to-date and accurate delay measurements. Accurate delay measurements means that the delay compensation based on those measurements is also accurate.

Figure 6A:
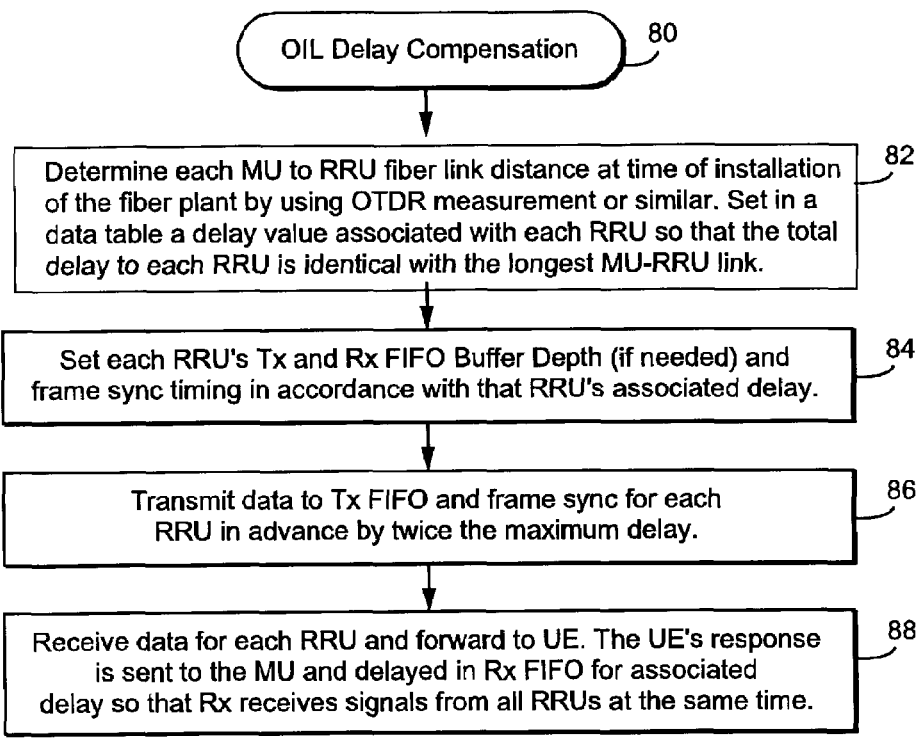
FIGS. 6A and 6B are flowcharts illustrating two example procedures for digital optical interface link delay measurement and compensation.
Figure 6B:
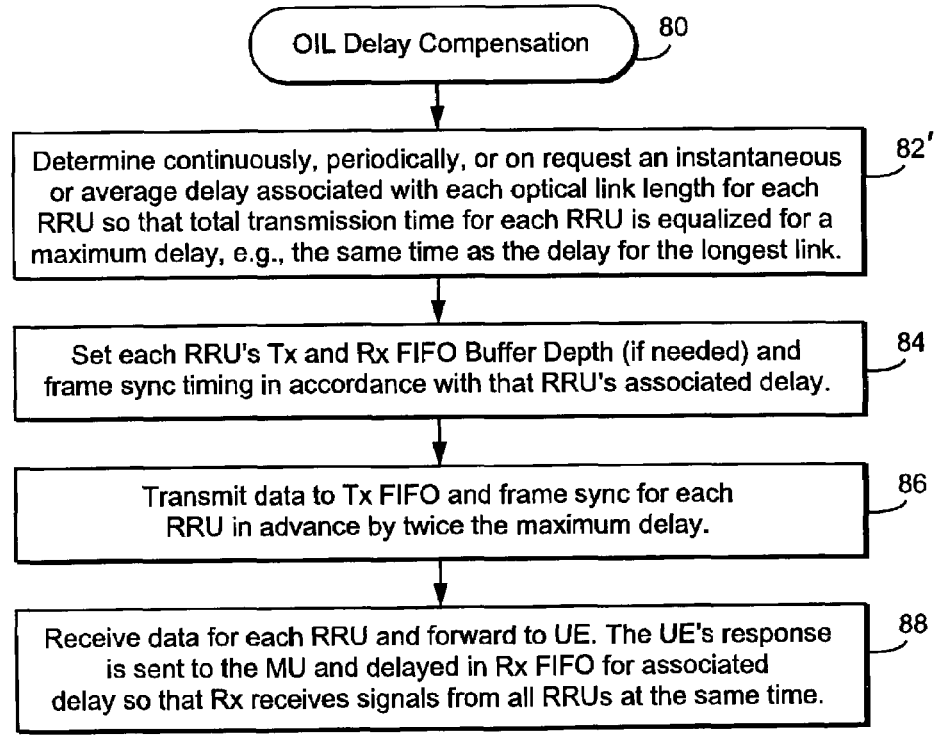

Example OIL Delay Compensation procedures (block 80) are described in conjunction with the flowcharts in FIGS. 6A and 6B. The procedures in FIG. 6A relate to the cascade configuration in FIG. 1A with manual delay measurement, and the procedures in FIG. 6B relates to the cascade configuration in FIG. 1C with automatic delay measurement. Starting with block 82 in FIG. 6A, the distance between the main unit and each RRU is measured manually, e.g., at time of installation, using known techniques such as OTDR (Optical Time Domain Reflectometer) or the like. The delay values associated with each RRU are stored in the data table 62 so that the total delay to each RRU is identical with the longest MU-RRU distance. Starting with block 82 in FIG. 6B, the timing compensation controller 52 determines, using the data table 62 values for each RRU, an instantaneous or average time delay associated with its optical link length. That delay determination may (if desired) be performed continuously, periodically, or on request from the timing compensation controller 52.

In general for both FIGS. 6A and 6B, the timing compensation controller 52 uses the reported delays to calculate an individual additional delay for each RRU to equalize the overall transmission times for each RRU. The additional delay is introduced into the transmission chain using the transmission FIFO buffer 46 and the receive FIFO buffer 48. For example, the overall delay of transmitted signals for all of the RRUs can be equalized to the RRU delay time that is the longest. The longest RRU delay time of all the OIL links may be the "maximum delay" or some larger delay time if desired.

In block 84 in both FIGS. 6A and 6B, the difference between the maximum delay time and the RRU's associated delay is used to determine each RRU's transmission and receiver FIFO buffer depths and frame sync advance timing. For the RRU associated with the longest delay, if the maximum delay equals that longest delay, the FIFO delay is zero. For RRUs with delays shorter than the maximum delay, the additional delay caused by each transmission FIFO buffer and receive FIFO buffer is selected so that the total FIFO buffer delay together with the RRU delay equals the maximum link delay. For all of the RRUs, the main unit sends the data "early" from the time they would otherwise be transmitted if there was no delay associated with the optical links to the RRUs (block 86 in both FIGS. 6A and 6B). In a preferred example embodiment, the advance timing is twice the maximum link delay. Each RRU receives that information from the main unit and forwards the information to the mobile radio UE. The RRU sends the response from the UE to the main unit where it is delayed in the receive FIFO for a time corresponding to the set FIFO buffer depth (block 88 in both FIGS. 6A and 6B).

The advanced and synchronized timing benefits both the UE and the base station baseband receivers. The data from the main unit is transmitted from plural RRUs having different delays at the same time. This allows the UE baseband receiver to more easily process the plural signals without being affected by different optical link delays to the RRUs. Similarly, the timing of the response data from the UE forwarded by the plural RRUs over different length/delay optical links, which is provided from the receive FIFOs to the baseband receiver in the main unit, is not affected by the different lengths of the optical links. The main unit baseband receiver can therefore more easily process the plural signals without being affected by different optical link delays. These benefits enable softer handover in a CDMA-based cellular communications system without requiring a more complex RAKE receiver. A typical CDMA receiver is designed to handle a certain delay difference between signal components received from different antennas (for example when in softer handover) and/or via different propagation paths. This design is not made for the additional delay difference introduced by the different OIL link lengths in a main-remote base station. The invention aligns the timing of the different antennas, and preferably, the overall timing in the base station so that such a typical receiver can be used.

To determine the FIFO buffer depths for each RRU, the timing compensation controller 52 calculates from the optical link delays reported for each RRU the associated one-way delay for the optical link to each RRU and selects a maximum delay. In the following example shown in FIG. 7, the selected common delay is set equal to the longest calculated one-way delay. Each RRU has a different length optical link: OIL1, OIL2, and OIL3. The length of OIL1 is 2*OIL2. The length of OIL3 is 3*OIL2. The delay information for RRU1 and RRU2 must be compensated so that the delays associated with OIL1 and OIL2 equal the delay associated with OIL3, which is the maximum delay in this example. The UE is assumed to be equidistant from each of the 3 RRUs over the air interface, which is not required, but simplifies the example.

As described above, the main unit baseband transmitter data intended for the UE is sent to each transmit (TX) FIFO 46 in the main unit OIL equalizer 44 ahead of schedule by twice the maximum link delay. Here, the timing schedule is determined by the frame sync (FS) generated by the timing unit 20 and advanced by the time shifter 42. The goal is to transmit that data to each of the three FIFOs ahead of time so that after traversing their three respective transmit FIFO buffers and OIL links, the data is received at their respective RRUs at the same time. So the data to be sent to RRU1 is delayed in its TX FIFO buffer for a transmit alignment delay. The data to be sent to RRU2 is delayed in its TX FIFO buffer for a transmit alignment delay that is twice as long as the delay time in the RRU1 FIFO. There is no delay in the FIFO buffer for RRU3. As a result, all of the transmit data arrives at each RRU and is transmitted to the UE at the same time facilitating reception in the UE receiver, i.e., "transmit alignment." For this example, the downlink air interface traveling time from RRU to UE, the response time in the UE, the uplink air interface traveling time from UE to RRU are all assumed to be the same.

The goal is the same in the uplink direction. The UE's response data from each of the RRUs are received in their respective receive (RX) FIFOs after traversing their three respective OILs. The delay introduced by each of the RX FIFO buffers is the same as the delay introduced by the corresponding TX FIFO buffers for the downlink path towards the same RRU. The data from RRU1 is delayed in its RX FIFO buffer for a transmit alignment delay. The data to be sent to RRU2 is delayed in its RX FIFO buffer for a transmit alignment delay that is twice as long as the delay time in the RRU1 FIFO. There is no delay in the FIFO buffer for RRU3. As a result, all of the UE response data is sent to the main unit baseband receiver at the same time, i.e., "receive alignment."

Figure 8:
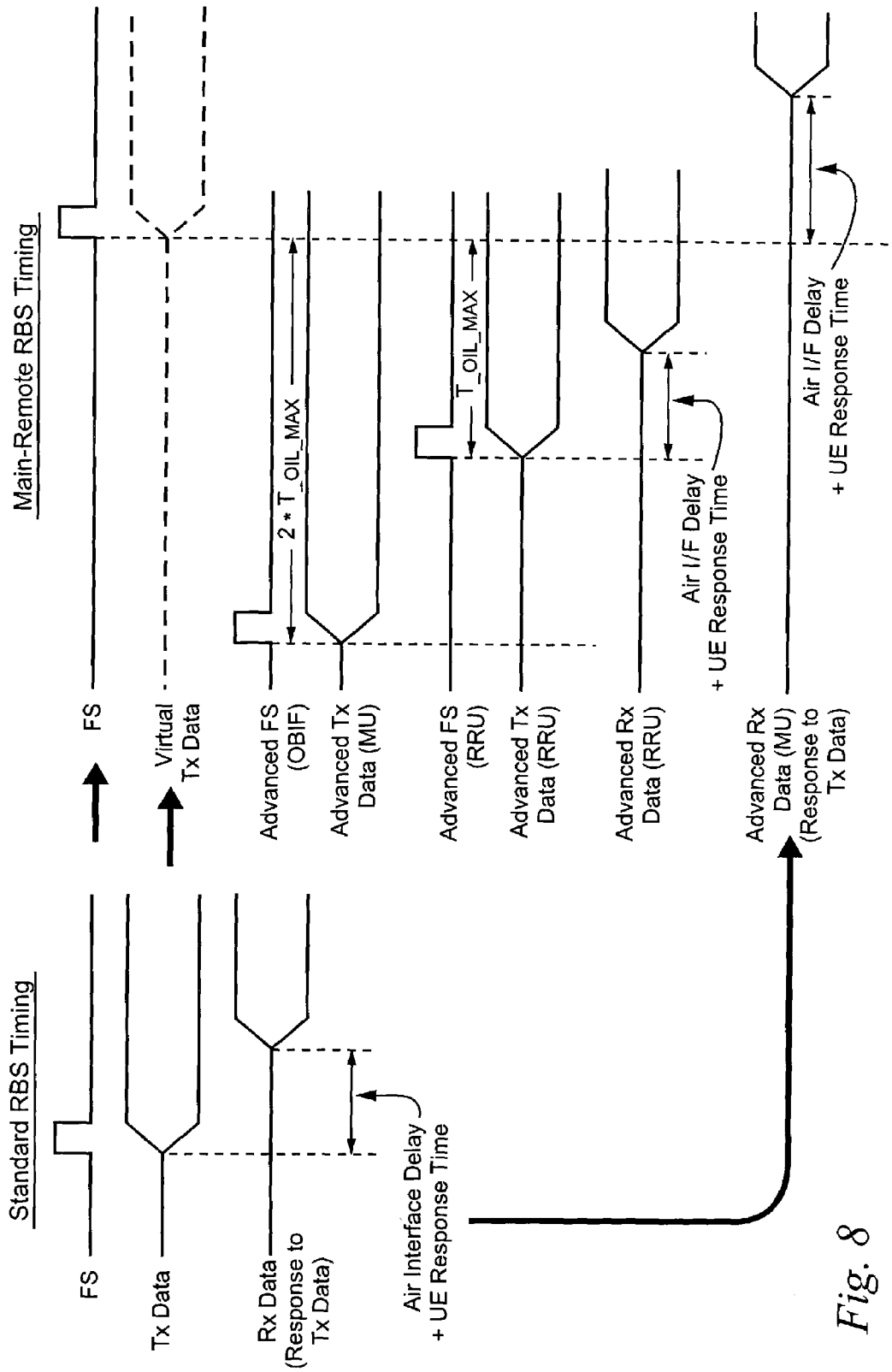
FIG. 8 shows timing diagrams to illustrate certain aspects of the digital optical interface link delay compensation in accordance with one example aspect of the invention.

The present invention achieves standard radio base station (RBS) timing in a main-remote radio base station. FIG. 8 shows on the left simplified, standard RBS timing diagrams. A frame sync (FS) pulse marks the time when the RBS starts sending a protocol frame with the transmit (TX) data to the UE over the air interface. The UE response to the TX data starts after an air interface and UE response delay. On the right, the main-remote timing is illustrated. The frame sync is sent from the main unit to each RRU over the length-equalized OIL link in advance by twice the maximum delay shown as 2*T_OIL_MAX from the time when it would be normally be sent by a standard RBS. The transmit data frame is also sent from the main unit to each RRU over the length-equalized OIL link in advance by twice the maximum delay shown as 2*T_OIL_MAX from the time when it would be normally be sent by a standard RBS. The RRU receives the frame sync and transmit data in advance by the maximum delay shown as T_OIL_MAX. After the air interface and UE response time, which is the same as in the normal case shown on the left side, the RRU sends the UE response over the RRU's OIL. After passing through the RX FIFO buffers, all data frames are aligned and reach the uplink baseband processing circuitry at the correct timing referenced by the unshifted frame sync signal.

Advancing the frame sync and data sending time compensates for the optical link delays in a main-remote design. The FIFO buffer depth control described above equalizes the optical link delay differences. Each RRU sends the transmit data to the UE at the same time, and the UE response data is received in the receiver at the same time. In this way, a main-remote base station can function just like a standard base station.

Instead of providing an advanced timing reference to the baseband transmitters so that the downlink data is sent early towards the radio remote unit, a delayed timing reference may be provided to the baseband receivers. In that case, the unshifted frame sync signal is used as a timing reference for the baseband transmitters. Thus, the OIL link equalization may be used with advanced transmitter timing or delayed receiver timing.

Figure 9:
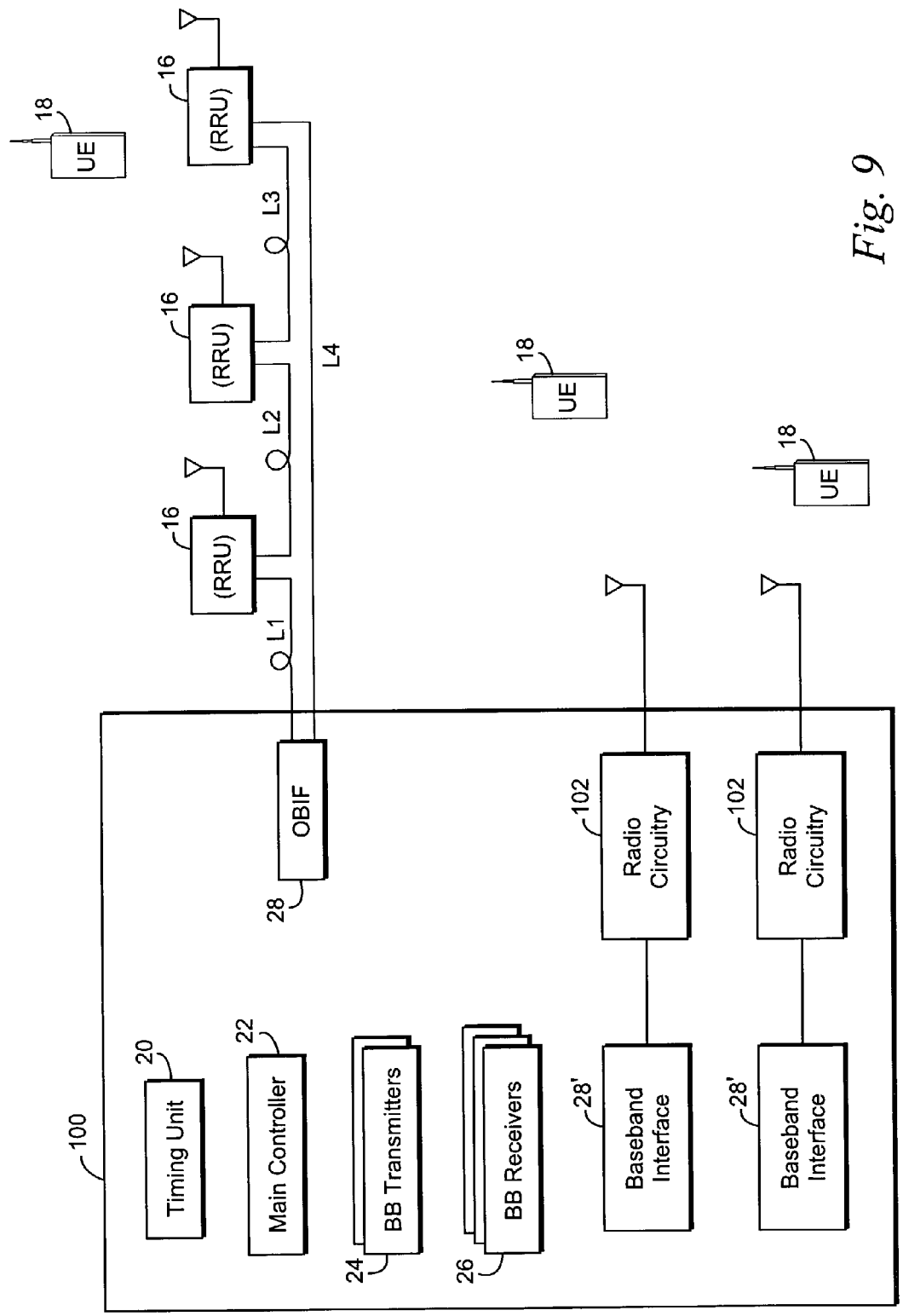
FIG. 9 illustrates in function block form a hybrid base station that employs one application of the invention.

Another example embodiment of the invention illustrated in function block format in FIG. 9 incorporates a main-remote base station with a conventional base station in what is referred to as a hybrid base station 100. The hybrid base station 100 includes conventional base station circuitry incorporating elements of the main unit 12 shown in FIG. 2. Three representative remote units 16a–16c are shown coupled in a cascade configuration to OBIF 28. Each conventional base station radio circuitry 102 is referred to as a "near" radio unit and is coupled to a corresponding baseband interface unit 28'. The near radio circuitry 102 is similar to the RRU circuitry 16 (e.g., transceiver, power amplifier, duplex filter, low noise amplifier, antenna, etc.), with the exception of an OBIF 30. No optical link couples the radio circuitry 102 with the baseband transmitters 24 or baseband receivers 26, so there is no need for an OBIF 30. But there is still a need for synchronization between the different radio units. The conventional and main-remote portions of the hybrid base station should be synchronized in order to support softer handover between the near radio units 102 and the remote radio units 16 and possibly to fulfill timing requirements imposed by cellular communications standards like 3GPP.

In accordance with this aspect of the invention, each conventional base station radio circuitry 102 is treated like an RRU with a link length of zero corresponding to no link delay. Each near radio unit 102 is associated with a baseband interface 28' that provides the maximum buffering time using, for example, the transmit and receive FIFOs and frame sync advance approach described above. The buffering and frame sync advance ensures that all of the signals received from both near and remote antennas can be readily combined in a rake receiver. No round trip delay measurement is needed for near radio units because the zero round trip delay is already known. Synchronization between near and remote radio units in a hybrid base station allows existing base stations to be enhanced with RRUs without having to significantly alter the conventional base station or alter its timing.

The present invention provides a cost effective optical fiber configuration to couple a base station main unit and plural base station remote units. Only a single optical fiber loop is needed to carry information between the main unit and the remote units. The configuration avoids the expense and drawbacks if WDM technology were used in a single fiber loop configuration. Lasers, filters, and optical add/drop multiplexers (OADMs) for each RRU are not needed thereby eliminating costs necessary for a WDM fiber loop configuration. The logistical WDM overhead required to keep track of different wavelength dependent devices is also avoided. In addition to cost savings, the invention compensates for time delay differences associated with different remote units coupled in series by a single fiber to ensure synchronization.

While the present invention has been described with respect to particular embodiments, those skilled in the art will recognize that the present invention is not limited to these specific exemplary embodiments. Different formats, embodiments, and adaptations besides those shown and described as well as many variations, modifications, and equivalent arrangements may also be used to implement the invention. For example, while FIFO buffers were described as delay mechanisms, other delays could be used like shift registers, dual port memories with offset read/write addresses, etc. Although the invention is described using preferred embodiments, they only illustrate examples of the present invention. Accordingly, it is intended that the invention be limited only by the scope of the claims appended hereto.

What is claimed is:

1. A main-remote radio base station system, comprising:
N remote radio units, N being an integer equal to or greater than 2, each remote radio unit including a remote digital optical interface;
a main unit including a main digital optical interface; and
an optical fiber for communicating information between the main unit and the remote units, the optical fiber including a first fiber path for communicating digital information from the main unit to the remote units and a second fiber path for communicating digital information from the remote radio units to the main unit, each of the first and second fiber paths including one or more optical links;
wherein the main and remote units are coupled together in a series configuration by the optical fiber, and
wherein the main and remote digital optical interface units are configured so that information from the main unit is sent over the first fiber path to the remote units at an advanced time relative to a time reference so that the same information is transmitted over a radio interface by the serially-configured remote units at substantially the same time despite different delays associated with each remote radio unit and the main unit receives the same information from each of the serially-configured remote units over the second fiber path at substantially the same time despite different delays associated with each remote radio unit.

2. The main-remote radio base station system in claim 1, wherein each remote unit is configured to remove from a received frame its corresponding data word, include an uplink word in the removed word's place, and pass the frame to the next remote unit.

3. The main-remote radio base station system in claim 1, wherein along the first fiber path, the main unit is connected by a first link to a first remote unit in the series, the first remote unit is connected by a next link to a next remote unit in the series, and so forth, with the N remote unit in the series being connected by an N+1 link to the main unit, and wherein uplink information from the first remote unit is sent to the main unit via the N+1 link which corresponds to the second fiber path.

4. The main-remote radio base station system in claim 3, wherein the series configuration includes another optical fiber with third and fourth fiber paths pair for communicating information between the main unit and the remote units but in a direction opposite that of the one loop direction, the third fiber path communicating information from the main unit to the remote units and the fourth fiber path communicating information from the remote radio units to the main unit, each of the third and fourth fiber paths including one or more links.

5. The main-remote radio base station system in claim 1, wherein the series configuration includes the main unit connected by a first downlink and uplink fiber pair to a first remote unit, the first remote unit connected by a second downlink and uplink fiber pair to a second remote unit, and so forth to the Nth remote unit.

6. The main-remote radio base station system in claim 1, wherein the N remote units correspond to N sectors of the base station.

7. The main-remote radio base station system in claim 1, wherein the main unit is configured to combine N words of data, one word corresponding to each of the N remote units, into a frame and to transmit the frame on the first fiber path.

8. The main-remote radio base station system in claim 7, wherein the main unit is configured to transmit data over the first fiber path at N times the data rate desired for each main unit to remote unit data transmission.

9. The main-remote radio base station system in claim 8, wherein the main digital optical interface unit includes for each remote radio unit a timing compensator for compensating a delay associated with that remote radio unit by advancing a time when a data word is sent in a frame over the first fiber path.

10. The main-remote radio base station system in claim 9, wherein the main unit includes a timing compensation controller configured to receive a delay associated with each of the N remote units, select a maximum delay, and control the timing compensator for each remote radio unit to compensate for the maximum delay.

11. The main-remote radio base station system in claim 10, wherein the main unit includes a data table for storing a delay determined for each of the remote units.

12. The main-remote radio base station system in claim 11, wherein the delay for each RRU is measured manually.

13. The main-remote radio base station system in claim 10, wherein the main unit includes a counter for determining a delay for each of the remote units.

14. The main-remote radio base station system in claim 9, wherein the main unit includes for each remote radio unit a transmit buffer and a receive buffer, and wherein the timing compensation controller is configured to set a transmit time that the data word is stored in the transmit buffer before the data word is transmit on the first fiber path and to set a receive time that a responsive data word from the remote radio unit is stored in the receive buffer.

15. The main-remote radio base station system in claim 9, wherein the timing compensation controller is configured to set a transmit time and a receive time by controlling a buffer depth of the transmit and receive buffers.

16. The main-remote radio base station system in claim 1, wherein the main unit includes:
   a serializer for combining a digital parallel word for each remote unit into a frame, generating a serial signal of framed data words, each data word including digital data, a digital synchronization signal, and a digital control signal;
   an electrical-to-optical converter for converting the serial signal into a corresponding optical signal transmitted over the first fiber path;
   an optical-to-electrical converter for converting an optical signal received over the second fiber path into a serial digital stream of framed data words;
   a deserializer for demultiplexing the serial digital stream from the optical-to-electrical converter into parallel data words, each data word corresponding to one of the remote units and having a digital data signal, a digital synchronization signal, and a digital control signal.

17. The main-remote radio base station system in claim 1, wherein the distance to one or more of the remote units is on the order of meters up to 10 kilometers or more.

18. The main-remote radio base station system in claim 1, wherein the main and remote units are coupled together by the fiber optic pair in a ring configuration.

19. The main-remote radio base station system in claim 1, further comprising one or more near radio units coupled near to the main unit or incorporated as part of the main unit,
   wherein the main, near, and remote units are configured so that the same information from the main unit to the near and remote units is received at the near and remote units at substantially the same time and the main unit receives the same information from each of the remote units at substantially the same time.

20. A method for communicating information in a main-remote radio base station system using an optical fiber coupling plural remote radio units and a main unit in a series configuration, comprising:
   determining for each remote radio unit a corresponding delay, and
   for each remote radio unit, the main unit sending a data signal over a downlink fiber coupling the main unit to the remote radio units in series at an advanced time relative to a time reference so that the data signal is received at each of the remote radio units at substantially the same time despite the different delays associated with each remote radio unit and so that a response to the digital data signal sent by each of the remote radio units is received in the main unit via an uplink fiber at substantially the same time despite the different delays associated with each remote radio unit.

21. The method in claim 20, wherein for N remote units, the main unit sends the data signal at N times a desired data rate for each remote unit to receive data from the main unit.

22. The method in claim 20, wherein the delay associated with each remote radio unit is determined manually or automatically.

23. The method in claim 20, further comprising:
   from the delays associated with each remote unit, selecting a maximum delay, and
   advancing the time when the data signal is sent over the downlink fiber to compensate for the maximum delay.

24. The method in claim 23, further comprising for each remote radio unit:
   buffering the data signal in a transmit buffer for a transmit time before the data signal is sent on the downlink fiber, and
   buffering in a receive buffer a responsive data signal from the remote digital interface unit for a receive time.

25. The method in claim 20, further comprising:
   for each of the remote units, generating a serial signal of framed data words, each data word including digital data, a digital synchronization signal, and a digital control signal;
   converting the serial signal into a corresponding optical signal transmitted over the downlink fiber;
   converting an optical signal received over the uplink fiber into a serial digital stream of frames; and
   demultiplexing the serial digital stream from the optical-to-electrical converter into framed data words, each data word having a digital data signal, a digital synchronization signal, and a digital control signal.

26. A hybrid radio base station, comprising:
   a main base station unit including:
      baseband processing circuitry, and
      plural near radio units; and
   plural remote radio units;
   a first fiber path and a second fiber path for coupling the remote radio units and the main base station unit in a series configuration; and plural digital interface units, one for each near and remote radio unit, coupled to the baseband processing circuitry;

wherein each near radio unit digital interface and each remote radio unit digital interface includes a timing compensator for compensating for a delay associated with that remote radio unit by advancing a time when a data word is sent relative to a timing reference over the first fiber path so that a signal received by one of the near radio units and the same signal received by one of the remote radio units may be synchronized for processing in the baseband processing circuitry despite a delay associated with one of the remote radio units.

27. The hybrid radio base station system in claim 26, wherein the main unit is configured to combine N words of data, one word corresponding to each of the N remote units, into a frame and to transmit the frame on the first fiber path.

28. The hybrid radio base station system in claim 27, wherein the main unit is configured to transmit data over the first fiber path at N times the data rate desired for main unit to remote unit data transmissions.

29. The hybrid radio base station system in claim 28, wherein the main digital interface unit includes for each remote radio unit a timing compensator for compensating a delay associated with that remote radio unit by advancing a time when a data word is sent in a frame over the first fiber path.

30. The hybrid radio base station system in claim 29, wherein the main unit includes a data table for storing a delay determined for each of the remote units.

31. The hybrid radio base station system in claim 29, wherein the main unit includes a counter for determining a delay determined for each of the remote units.

32. A main unit for use in a main-remote radio base station system, comprising:

digital optical interface circuitry for communicating with N remote radio units, N being an integer equal to or greater than 2;

a first port configured to connect to one end of a first fiber for communicating information from the main unit to the remote units in series;

a second port configured to connect to the other end of the first fiber or to a second fiber for delivering information from the remote radio units to the main unit;

wherein the digital optical interface circuitry is configured to send information at an advanced time relative to a time reference from the main unit over the first fiber to the remote units so that the same information is transmitted over a radio interface by the remote units at substantially the same time despite different delays associated with each remote radio unit.

33. The main base station unit in claim 32, wherein the circuitry is configured to send information from the main unit over the first fiber at N times a desired data rate.

34. The main base station unit in claim 32, wherein the main unit is configured to combine N words of data, one word corresponding to each of the N remote units, into a frame and to transmit the frame on the first fiber.

35. The main base station unit in claim 34, wherein the main unit is configured to transmit data over the first fiber at N times the data rate desired for main unit to remote unit data transmissions.

36. The main base station unit in claim 35, wherein the main digital interface unit includes for each remote radio unit a timing compensator for compensating a delay associated with that remote radio unit by advancing a time when a data word is sent in a frame over the first fiber.

37. The main base station unit in claim 36, wherein the main unit includes a timing compensation controller configured to receive a delay associated with each of the N remote units, select a maximum delay, and control the timing compensator for each remote radio unit to compensate for the maximum delay.

38. The main base station unit in claim 37, wherein the main unit includes a data table for storing a delay determined for each of the remote units.

39. The main base station unit in claim 37, wherein the main unit includes a counter for determining a delay determined for each of the remote units.

40. The main base station unit in claim 37, wherein the main unit includes for each remote radio unit a transmit buffer and a receive buffer, and wherein the timing compensation controller is configured to set a transmit time that the data word is stored in the transmit buffer before the data word is transmit on the first fiber and to set a receive time that a responsive data word from the remote radio unit is stored in the receive buffer.

41. The main base station unit in claim 37, wherein the main unit includes:

a serializer for combining a digital parallel word for each remote unit into a frame, generating a serial signal of framed data words, each data word including digital data, a digital synchronization signal, and a digital control signal;

an electrical-to-optical converter for converting the serial digital signal into a corresponding optical signal transmitted over the first fiber path;

an optical-to-electrical converter for converting an optical signal received over the second fiber path into a serial digital stream of framed data words;

a deserializer for demultiplexing the serial digital stream from the optical-to-electrical converter into parallel data words, each data word corresponding to one of the remote units and having a digital data signal, a digital synchronization signal, and a digital control signal.

* * * * *